Patented Nov. 18, 1952

2,618,653

UNITED STATES PATENT OFFICE 2,618,653

CYCLOHEXYL METHYL KETONES

Frederick C. Novello, Prospect Park, Pa., assignor to Sharp & Dohme, Incorporated, Philadelphia, Pa., a corporation of Maryland No Drawing. Application July 24, 1951, Serial No. 238,387

6 Claims. (Cl. 260—488)

This application is concerned broadly with certain cyclohexyl methyl ketones. It is particularly concerned with cyclohexyl methyl ketones in which the cyclohexyl radical is substituted in the 2 position with a p-alkoxybenzyl radical. It is further concerned with 2-(p-alkoxybenzyl)-cyclohexylmethyl ketones in which the methyl group is substituted with either halogen, hydroxy or acetoxy.

The compounds of this invention can be represented conveniently by the general formula

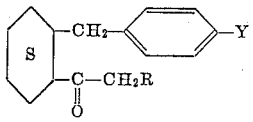

in which Y is chosen from the group consisting of methoxy and ethoxy and R is chosen from the group consisting of hydrogen, halogen, hydroxy and acetoxy.

The compounds of this invention can be prepared conveniently from hexahydrophthalic anhydride as a starting material. The hexahydrophthalic anhydride is treated with anisole or phenetol according to the Friedel-Crafts reaction and there is obtained a 2-(p-alkoxybenzoyl)-cyclohexane-1-carboxylic acid. This carboxylic acid is hydrogenated over copper chromite catalyst without solvent and there is obtained a 2-(p-alkoxybenzyl)-cyclohexane-1-carboxylic acid. Treatment of this carboxylic acid with thionyl chloride in dry benzene containing 1 drop of pyridine results in the formation of the acid chloride of the foregoing carboxylic acid. The benzene solution of the acid chloride is concentrated to dryness under vacuum thereby removing the benzene and the excess thionyl chloride. The dry residue is taken up in ether and the ether solution cooled to approximately 0–5° C. To this ether solution is added an ethereal solution of diazomethane containing a molecular excess of diazomethane. When the evolution of gas ceases, the solution is concentrated to dryness under vacuum at room temperature and crude diazoketone obtained.

The crude diazoketone is dissolved in ether and ether solution cooled to approximately 0–5° C. This solution is then treated with dry hydrogen chloride resulting in the decomposition of the diazoketone. After the evolution of nitrogen ceases, the solution is concentrated under vacuum to dryness and the product recrystallized from ether, yielding a 2-(p-alkoxybenzyl)-1-chloroacetylcyclohexane.

The bromomethyl ketone can be obtained by treating the crude diazoketone with dry hydrogen bromide rather than dry hydrogen chloride.

Starting with chloromethylketone obtained above, one obtains the methyl ketone of the invention by converting the chloro compound to the iodo compound and then reducing the iodo compound to the methyl compound according to known methods.

The hydroxy compound of the invention is obtained by treating the diazoketone compound with a mineral acid instead of hydrogen chloride as explained above. There is obtained a 2-(p-alkoxybenzyl)-1-hydroxyacetylcyclohexane.

The acetoxy compound of the invention is obtained by treating the crude diazoketone compound with glacial acetic acid instead of hydrogen chloride as described above. There is obtained a 2-(p-alkoxybenzyl)-1-acetoxyacetylcyclohexane.

The compounds of this invention possess physiological activity, exhibiting adrenocortical activity.

The compounds of this invention are illustrated by, but not necessarily restricted to, the following preferred embodiments:

EXAMPLE 1

*Preparation of 2-(p-methoxybenzyl)-1-chloroacetylcyclohexane.* — 2-(p-anisoyl)-cyclohexane-1-carboxylic acid was prepared by treating 32 g. (0.21 mole) hexahydrophthalic anhydride and 22.7 g. (0.21 mole) anisole in 400 ml. nitrobenzene at 0° C. with 80 g. (0.6 mole) aluminum chloride over a 15 minute period. The mixture was stirred at 0–5° C. for approximately 2 hours and then at 50° C. for 1½ hours. It was cooled and poured onto ice. After the ice melted, the solution was made alkaline with excess 20% sodium hydroxide, and the nitrobenzene removed by steam distillation. The alkaline solution was cooled and was acidified with a mineral acid. The crude product was then extracted with ether. The ether solution was washed with approximately equal volumes of water until acid free and dried over anhydrous sodium sulfate. The sodium sulfate was removed from the ether solution by filtration and the ether solution evaporated to dryness. The dry residue was recrystallized from ether-petroleum ether and there was obtained 2-(p-anisoyl)-cyclohexane-1-carboxylic acid.

15 g. (0.06 mole) 2-(p-anisoyl)-cyclohexane-1-carboxylic acid (obtained as above) and 1 g. copper chromite catalyst were placed in a glass lined receptacle in a steel bomb and hydrogen added to the bomb to a pressure of 1750 lbs. per square inch at room temperature. The bomb was sealed and the temperature raised to 170° C. and maintained thereat for approximately 3 hours and the bomb and its contents were shaken during this period. The contents of the bomb were cooled and removed therefrom. The reaction mixture was boiled together with approximately 350 ml. 10% sodium carbonate solution. The solution was filtered hot and after cooling was acidified with hydrochloric acid. There resulted a precipitate which was separated from the solution by filtration and recrystallized from ether-petroleum ether. There was obtained 2-(p-methoxybenzyl)-cyclohexane-1-carboxylic acid.

3.7 g. (0.015 mole) 2-(p-methoxybenzyl)-cyclohexane-1-carboxylic acid (obtained as above) in 30 ml. dry benzene containing one drop of pyridine was treated with 6 ml. of purified thionyl chloride. The reaction mixture was allowed to stand for approximately 40 minutes at room temperature, after which the mixture was warmed at 50° C. for 5 minutes and then concentrated to dryness in vacuo. A few milliliters of dry benzene was added and the solution again concentrated to dryness in vacuo in order to remove the thionyl chloride.

The residual oil, the crude acid chloride, was dissolved in 25 ml. absolute ether and the solution cooled to approximately 0–5° C. This solution was added to a cold solution of a molecular excess of diazomethane in 90 ml. ether. The reaction mixture was allowed to stand at room temperature for approximately 1 hour at which time gas evolution had ceased. The solution was concentrated to dryness under vacuum at room temperature and the crude diazoketone dissolved in 30 ml. absolute ether. The solution was cooled in ice and treated with dry hydrogen chloride. When the vigorous evolution of nitrogen had ceased the solution was concentrated to dryness in vacuo and the residue recrystallized from ether-petroleum ether. There was obtained 3.6 g. (86%) 2-(p-methoxybenzyl) - 1 - chloroacetylcyclohexane.

EXAMPLE 2

*Preparation of 2-(p-methoxybenzyl)-1-acetoxyacetylcyclohexane.*—Starting with 2.48 g. (0.01 mole) 2-(p-methoxybenzyl)-cyclohexane-1-carboxylic acid (obtained as in Example 1) a diazoketone was prepared according to the procedure outlined in Example 1. This crude diazoketone was dissolved in 7 ml. glacial acetic acid and warmed on a steam bath for approximately 1½ hours. The solution was cooled and then taken up in ether, washed with water, and then with 10% sodium carbonate solution. The ether layer was separated and dried over sodium sulfate. The sodium sulfate was separated by filtration and the ether solution evaporated to dryness. The residue was recrystallized from ether-petroleum ether and there was obtained 2.25 g. (74%) 2-(p-methoxybenzyl)-1-acetoxylacetylcyclohexane.

EXAMPLE 3

*Preparation of 2-(p-methoxybenzyl)-1-acetylcyclohexane.*—3.0 g. (0.01 mole) 2-(p-methaxybenzyl)-1-chloroacetylcyclohexane (obtained as in Example 1) was dissolved in a solution of 1.8 g. sodium iodide in 50 ml. acetone and the solution warmed on a steam bath for approximately 5 minutes. The solvent was removed in vacuo and the residual iodo compound dissolved in 25 ml. glacial acetic acid and treated with sufficient zinc dust to make the solution colorless. After warming on the steam bath for a few minutes, the solvent was removed in vacuo and the residue treated with water and extracted with ether. The ether layer was separated, washed with water, and dried over anhydrous sodium sulfate. The sodium sulfate was removed by filtration and the ether solution concentrated to dryness. The residue was distilled in vacuo and there was obtained 2.5 g. (95%) 2-(p-methoxybenzyl)-1-acetylcyclohexane.

EXAMPLE 4

*Preparation of 2-(p-ethoxybenzyl)-1-chloroacetylcyclohexane.*—Following the procedure outlined in Example 1 and substituting phenetole for the anisole used in the first step of that preparation, there was obtained 2-(p-ethoxybenzyl)-1-chloroacetylcyclohexane.

EXAMPLE 5

*Preparation of 2-(p-ethoxybenzyl)-1-acetoxyacetylcyclohexane.*—Following the procedure outlined in Example 2 and substituting for the crude diazoketone there used the crude diazoketone obtained in procedure of Example 4 there was obtained 2-(p-ethoxybenzyl)-1-acetoxyacetylcyclohexane.

EXAMPLE 6

*Preparation of 2-(p-ethoxybenzyl)-1-acetylcyclohexane.*—Following the procedure outlined in Example 3 and substituting for the 2-(p-methoxybenzyl)-1-chloroacetylcyclohexane there used an equimolar quantity of 2-(p-ethoxybenzyl)-1-chloroacetylcyclohexane (obtained as in Example 4) there was obtained 2-(p-ethoxybenzyl)-1-acetylcyclohexane.

EXAMPLE 7

*Preparation of 2-(p-methoxybenzyl)-1-iodoacetylcyclohexane.*—3.0 g. (0.01 mole) 2-(p-methoxybenzyl)-1-chloroacetylcyclohexane (obtained as in Example 1) was dissolved in a solution of 1.8 g. sodium iodide in 50 ml. acetone and the solution warmed on a steam bath for approximately 5 minutes. The solvent was removed in vacuo and the residual iodo compound recrystallized from ether-petroleum ether. There was obtained in 53% yield 2-(p-methoxybenzyl)-1-iodoacetylcyclohexane.

Similarly, starting with 2-(p-ethoxybenzyl)-1-chloroacetylcyclohexane (obtained as in Example 4) and following the above procedure there was obtained 2-(p-ethoxybenzyl)-1-iodoacetylcyclohexane.

EXAMPLE 8

*Preparation of 2-(p-methoxybenzyl)-1-bromoacetylcyclohexane.*—Starting with the same materials and following the procedure outlined in Example 1 there was prepared the crude diazoketone described in the last paragraph of Example 1. The crude diazoketone was dissolved in 30 ml. absolute ether and the solution cooled in an ice bath and treated with dry hydrogen bromide. When the vigorous evolution of nitrogen had ceased, the solution was concentrated to dryness in vacuo and the residue recrystallized from ether-petroleum ether. There was obtained in 73% yield 2-(p-methoxybenzyl)-1-bromoacetylcyclohexane.

Similarly, following the above procedure and substituting the crude diazoketone obtained as in Example 4 there was obtained 2-(p-ethoxybenzyl)-1-bromoacetylcyclohexane.

EXAMPLE 9

*Preparation of 2 - (p-methoxybenzyl) - 1 - hy-*

*droxyacetylcyclohexane.*—Starting with 2.48 g. (0.01 mole) 2-(p-methoxybenzyl)-cyclohexane-1-carboxylic acid (obtained as in Example 1) a diazoketone was prepared according to the procedure outlined in Example 1. This crude diazoketone was dissolved in 25 ml. of dioxane and treated with 15 ml. 2 N sulfuric acid. The solution was allowed to stand 15 minutes at room temperature and 45 minutes at 40° and then diluted with 25 ml. of water. The product was extracted with ether and the ethereal solution washed with two 25 ml. portions of water, two 25 ml. portions of saturated sodium bicarbonate solution and dried over anhydrous sodium sulfate. The ethereal solution was filtered and the solution concentrated to a volume of approximately 10 ml., diluted with petroleum ether and allowed to crystallize. There was obtained 1.3 g. (50%) of 2-(p-methoxybenzyl)-1-hydroxyacetylcyclohexane.

EXAMPLE 10

*Preparation of 2-(p-ethoxybenzyl)-1-hydroxyacetylcyclohexane.*—Following the foregoing procedure and substituting for the crude diazoketone there used the crude diazoketone obtained in procedure of Example 4, there was obtained 2-(p-ethoxybenzyl)-1-hydroxyacetylcyclohexane.

This is a continuation in part of my application Serial No. 179,891, filed on August 16, 1950, for 2-(p-alkoxybenzyl)-cyclohexyl methyl ketones and derivatives.

What is claimed is:

1. Compounds of the formula

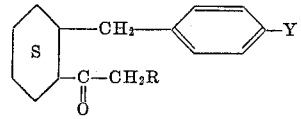

in which Y is chosen from the group consisting of methoxy and ethoxy and R is chosen from the group consisting of hydrogen, halogen, hydroxy and acetoxy.

2. 2-(p-methoxybenzyl)-1-acetylcyclohexane.

3. 2 - (p - methoxybenzyl) - 1 - chloroacetylcyclohexane.

4. 2 - (p - methoxybenzyl) - 1 - acetoxyacetylcyclohexane.

5. 2-(p - methoxybenzyl)-1-bromoacetylcyclohexane.

6. 2 - (p - methoxybenzyl) - 1 - hydroxyacetylcyclohexane.

FREDERICK C. NOVELLO.

No references cited.